(12) United States Patent
Inoue et al.

(10) Patent No.: US 7,151,648 B2
(45) Date of Patent: Dec. 19, 2006

(54) DISK CARTRIDGE

(75) Inventors: Naoki Inoue, Kanagawa (JP); Susumu Shibagaki, Kanagawa (JP); Yasuyuki Abe, Miyagi (JP)

(73) Assignee: Sony Corporation, Tokyo (JP)

( * ) Notice: Subject to any disclaimer, the term of this patent is extended or adjusted under 35 U.S.C. 154(b) by 298 days.

(21) Appl. No.: 10/495,089

(22) PCT Filed: Sep. 5, 2003

(86) PCT No.: PCT/JP03/11371

§ 371 (c)(1),
(2), (4) Date: May 10, 2004

(87) PCT Pub. No.: WO2004/029967

PCT Pub. Date: Apr. 8, 2004

(65) Prior Publication Data

US 2005/0018350 A1    Jan. 27, 2005

(30) Foreign Application Priority Data

Sep. 11, 2002   (JP) .............................. 2002-265119

(51) Int. Cl.
G11B 23/03    (2006.01)

(52) U.S. Cl. ...................................... 360/133
(58) Field of Classification Search ................ 360/133; 720/725, 737, 723
See application file for complete search history.

(56) References Cited

U.S. PATENT DOCUMENTS

| | | | |
|---|---|---|---|
| 4,194,228 A * | 3/1980 | Duff | 360/133 |
| 5,103,363 A | 4/1992 | Yamada et al. | |
| 5,241,441 A * | 8/1993 | Yamada et al. | 360/133 |
| 5,315,470 A * | 5/1994 | Fujino et al. | 360/133 |
| 2002/0031080 A1 | 3/2002 | Inoue | |
| 2004/0022172 A1 * | 2/2004 | Obata et al. | 369/291 |

FOREIGN PATENT DOCUMENTS

| | | |
|---|---|---|
| EP | 0 651 390 | 5/1995 |
| JP | 2000 311461 | 11/2000 |
| JP | 2001 184825 | 7/2001 |
| JP | 2001 283552 | 10/2001 |

* cited by examiner

Primary Examiner—Allen Cao
(74) Attorney, Agent, or Firm—Oblon, Spivak, McClelland, Maier & Neustadt, P.C.

(57) ABSTRACT

A disk cartridge does not require a plate supporter for holding a chucking plate on an upper shell. In this disk cartridge, a chucking plate for chucking a disk on a turntable, driven by a spindle motor, is placed on the middle of the disk so the chucking plate is vertically movable together with the disk. The disk cartridge further includes a peripheral cylindrical rib which is not in contact with the disk and is configured to limit movement of the chucking plate in the direction of its diameter while permitting the vertical movement of the chucking plate. The peripheral cylindrical rib is molded integral with the lower surface of the upper shell.

5 Claims, 19 Drawing Sheets

US 7,151,648 B2

DISK CARTRIDGE

TECHNICAL FIELD

The present invention relates to disk cartridges accommodating magneto-optical (MO) disks, optical disks including digital versatile disks (DVDs) and DVD-ROMs, or other disk recording media. In particular, the present invention relates to a technical field of a supporting structure of a chucking plate in a disk cartridge, the chucking plate being suitable for a highly dustproof disk cartridge in which shutters are capable of opening and closing an opening of a lower shell by being opened and closed by rotation of an inner rotor.

BACKGROUND ART

FIGS. 18 and 19 are cross-sectional views of a conventional disk cartridge 51. The disk cartridge 51 is composed of an upper shell 52 and a lower shell 53, which are molded components (synthetic resin molded components; hereinafter referred to as molded components). A disc 54, which is a molded component and a disk recording medium, such as a 12 cm optical disk including a DVD or a DVD-ROM, or a magneto-optical disk, is horizontally accommodated inside the disk cartridge 51 so as to be rotatable and movable vertically (in the directions of the arrows a and b).

An oblong opening 53a is formed in the lower shell 53 from a substantial center to a front edge thereof, and a turntable 61 and an optical pickup (not shown) described later are inserted from the bottom of the opening 53a. A chucking plate 55 composed of a ferromagnetic material such as stainless steel and formed by presswork is arranged on or above the middle of the disk 54 inside the disk cartridge 51. The chucking plate 55 is held by a plate supporter 56 of a molded component or the like below the upper shell 52 so as to be rotatable and movable vertically (in the directions of the arrows a and b).

In this case, the chucking plate 55 has a disk shape. A central circular recess 55a projecting upward is formed concentrically in the center of the chucking plate 55. A disk pressing portion 55b projecting downward is formed concentrically outside the central circular recess 55a. A tapered portion 55c having a diameter gradually increasing with height is formed concentrically outside the disk pressing portion 55b. A horizontal peripheral flange 55d is formed around the tapered portion 55c.

The plate supporter 56 is an integrated component including a peripheral flange 56a, a cylindrical rib 56b projecting downward from an inner edge of the peripheral flange 56a in the vertical direction, and an inner flange 56c formed concentrically and horizontally at an inner region defined by the bottom end of the cylindrical rib 56b.

The inside diameter of the cylindrical rib 56b of the plate supporter 56 is larger than the outside diameter of the chucking plate 55. The peripheral flange 55d of the chucking plate 55 is in advance disposed in an inner region defined by the cylindrical rib 56b, and the peripheral flange 56a of the plate supporter 56 is horizontally mounted on a lower (inner) surface 52a of the upper shell 52 by ultrasonic welding or the like. The chucking plate 55 is therefore held so as to be rotatable between the upper shell 52 and the inner flange 56c of the plate supporter 56 and movable vertically (in the directions of the arrows a and b).

As shown in FIG. 18, when the disk cartridge 51 is not used, the disk 54 moves down in the direction of the arrow a under its own weight. As a result, the disk 54 is horizontally placed on the lower shell 53 such that the lower surface 54a at an outer region around a center hole 54b of the disk 54 comes into contact with the upper (inner) surface 53b of the lower shell 53 at an inner rib 53c molded integral with an outer region of the opening 53a and a data recording region 54c is disposed away from the upper surface 53b of the lower shell 53.

The chucking plate 55 also moves down in the direction of the arrow a under its own weight so that the tapered portion 55c of the chucking plate 55 comes into contact with an inner edge of the inner flange 56c of the plate supporter 56 from above and thereby centering the chucking plate 55. The peripheral flange 55d of the chucking plate 55 is thus horizontally placed on the inner flange 56c of the plate supporter 56. A gap G11 is formed between a lower surface of the annular disk pressing portion 55b, which is the lowest part in the chucking plate 55, and an upper surface 54d of the disk 54.

As shown FIG. 19, when the disk cartridge 51 is loaded into a disk drive device (not shown), the turntable 61 driven by a spindle motor (not shown) and the optical pickup (not shown) are inserted into the opening 53a of the lower shell 53 from below relatively in the direction of the arrow b. A centering projection 61a, which is formed in the central upper part of the turntable 61 and has the shape of a substantially truncated cone, is inserted into the center hole 54b of the disk 54 from the direction of the arrow b. The disk 54 is thus centered and the lower surface 54a of the disk 54 at the outer region around the center hole 54b is horizontally placed on an annular disk mounting face 61b that is horizontally formed in an outer region of the turntable 61. The disk 54 is then moved up relatively in the direction of the arrow b to a substantial middle position between the upper shell 52 and the lower shell 53 in the disk cartridge 51 by the turntable 61. As a result, the disk 54 is supported not in contact with the upper shell 52 or the lower shell 53, and the optical pickup approaches the lower surface 54a of the disk 54.

At this time, the disk 54 is moved up in the direction of the arrow b by the turntable 61 so that the upper surface 54d at the outer region around the center hole 54b of the disk 54 comes into contact with the disk pressing portion 55b of the chucking plate 55 from below and thereby moving this chucking plate 55 up relatively in the direction of the arrow b. Additionally, at this time, a circular chucking magnet 62, which is mounted into the center of the centering projection 61a of the turntable 61, is inserted into an inner region defined by the central circular recess 55a of the chucking plate 55 from the direction of the arrow b, and the chucking magnet 62 approaches the chucking plate 55 from below.

The chucking plate 55 is then attracted in the direction of the arrow a by magnetic attraction of the chucking magnet 62. As a result, the annular disk pressing portion 55b of the chucking plate 55 crimps the upper surface 54d of the disk 54 at the outer region around the center hole 54b onto the annular disk mounting face 61b of the turntable 61 from the direction of the arrow a and fixes it, i.e., the disk 54 is chucked.

The chucking of the disk 54 allows the tapered portion 55c and the peripheral flange 55d of the chucking plate 55 to be not in contact with the cylindrical rib 56b or the inner flange 56c of the plate supporter 56. The disk 54 is then driven to be rotated by the turntable 61 driven by the spindle motor inside the disk cartridge 51. During rotation of the chucked disk in which data is recorded to and/or played back from the data recording region 54c of the disk 54 by the optical pickup, the chucking plate 55 is rotated together with the disk 54 in such a way that the chucking plate 55 is not in contact with the upper shell 52 or the plate supporter 56.

During this rotation of the chucked disk, four gaps are defined by the disk 54, the chucking plate 55, the upper shell 52, and the plate supporter 56: a gap G12 is defined between the edge of the peripheral flange 55d of the chucking plate 55 and an inner surface of the cylindrical rib 56b of the plate supporter 56 in the horizontal direction; a gap G13 is defined between the peripheral flange 55d and the lower surface 52a of the upper shell 52 in the vertical direction; a gap G14 is defined between the peripheral flange 55d and the inner flange 56c of the plate supporter 56 in the vertical direction; and a gap G15 is defined between the inner flange 56c and the disk 54 in the vertical direction.

However, in the conventional disk cartridge 51, the structure in which the upper shell 52 holds the chucking plate 55 by the plate supporter 56 mounted on the lower surface 52a of the upper shell 52 by ultrasonic welding or the like requires a molding step of the plate supporter 56 and a mounting step by ultrasonic welding, thus incurring additional cost.

Additionally, as shown in FIG. 19, since the inner flange 56c of the plate supporter 56 mounted on the lower surface 52a of the upper shell 52 is placed between the disk 54 and the peripheral flange 55d of the chucking plate 55, it is necessary to consider the thickness B of the inner flange 56c of the plate supporter 56 within the inner thickness A defined between the lower surface 52a of the upper shell 52 and the upper surface 53b of the lower shell 53 of the disk cartridge 51 in the vertical direction.

In other words, as shown in FIG. 19, since the inner thickness A includes the thickness B of the inner flange 56c, gaps defined by the upper shell 52, the disk 54, and the chucking plate 55 in the vertical direction to be particularly considered during the rotation of the chucked disk are as many as three gaps G13, G14, and G15.

In proportion to the number of the gaps to be considered, each of the dimensions of the gaps must be reduced. Therefore, the sizes of these three gaps G13, G14, and G15 are inevitably reduced.

If these three gaps G13, G14, and G15 are significantly small, the disk 54 and the chucking plate 55 tend to come into contact with the inner flange 56c of the plate supporter 56 when the disk 54 and the chucking plate 55 are driven to be rotated together with the turntable 61. This results in decreased reliability. Additionally, since the upper shell 52, the lower shell 53, and the plate supporter 56 being molded components and the like shrink or expand with environmental variations, such as temperature or humidity variations, and the thickness of the disk 54 varies in a manufacture process, the reliability is further decreased.

One way to solve these problems is that the thickness C, which is the entire thickness of the disk cartridge 51, is increased so as to increase the dimensions of the gaps G13, G14, and G15. However, this way is not available when the thickness C, which is the external thickness of the disk cartridge 51, is predetermined by a standard.

The present invention is accomplished to solve the above-described problems. An object of the present invention is to provide a disk cartridge that does not require a plate supporter for holding a chucking plate on an upper shell.

DISCLOSURE OF INVENTION

To achieve the object described above, according to an aspect, the present invention provides a disk cartridge accommodating a disk recording medium for recording and/or playing back data between an upper shell and a lower shell so that the disk recording medium is rotatable and vertically movable, the disk cartridge comprising: a chucking plate provided on the middle of the disk recording medium so as to be vertically movable in accordance with the vertical movement of the disk recording medium and for chucking the center of the disk recording medium on a turntable; and positioning means formed in the lower surface of the upper shell and arranged not in contact with the chucking plate during rotation of the disk recording medium, the positioning means limiting movement of the chucking plate in the direction of its diameter while permitting the vertical movement of the chucking plate.

According to the disk cartridge described above in the present invention, the chucking plate for chucking the disk recording medium on the turntable driven by a spindle motor is not supported by the upper shell but placed on the middle of the disk recording medium so as to be vertically movable together with the disk recording medium, and the positioning means being not in contact with the disk recording medium and limiting movement of the chucking plate in the direction of its diameter while permitting the vertical movement of the chucking plate is formed in the lower surface of the upper shell. Therefore, unlike a conventional arrangement, there is no need to hold the chucking plate by the plate supporter fixed on the lower surface of the lower shell by ultrasonic welding or the like.

BRIEF DESCRIPTION OF THE DRAWINGS

FIG. 2 is an illustration for explanation of the reason why a chucking plate is not accidentally fitted into a space between a disk and an upper shell of the disk cartridge shown in FIG. 1 in transit or the like.

FIG. 5 is an illustration for explanation of the reason why a chucking plate is not accidentally fitted into a space between a disk and an upper shell of the disk cartridge shown in FIG. 4 in transit or the like.

BEST MODE FOR CARRYING OUT THE INVENTION

Embodiments of a disk cartridge according to the present invention will now be described with reference to FIGS. 1 to 17 as follows:

(1) Explanation of disk chucking structures of the disk cartridge (FIGS. 1 to 11)

(2) Explanation of an outline of the overall disk cartridge (FIGS. 12 to 17)

(1) Explanation of Disk Chucking Structures of the Disk Cartridge

Disk chucking structures of a disk cartridge 1 according to first, second, third, and fourth embodiments will now be described with reference to FIGS. 1 to 11. The disk cartridge 1 has an inner rotor 11 and a pair of shutters 12 and 13, which will be described below with FIGS. 12 to 17. However, the inner rotor 11 and the pair of shutters 12 and 13 are omitted from the explanation in this section.

With FIGS. 1 to 3, a disk chucking structure of the disk cartridge 1 according to the first embodiment will be described.

Figure 18:
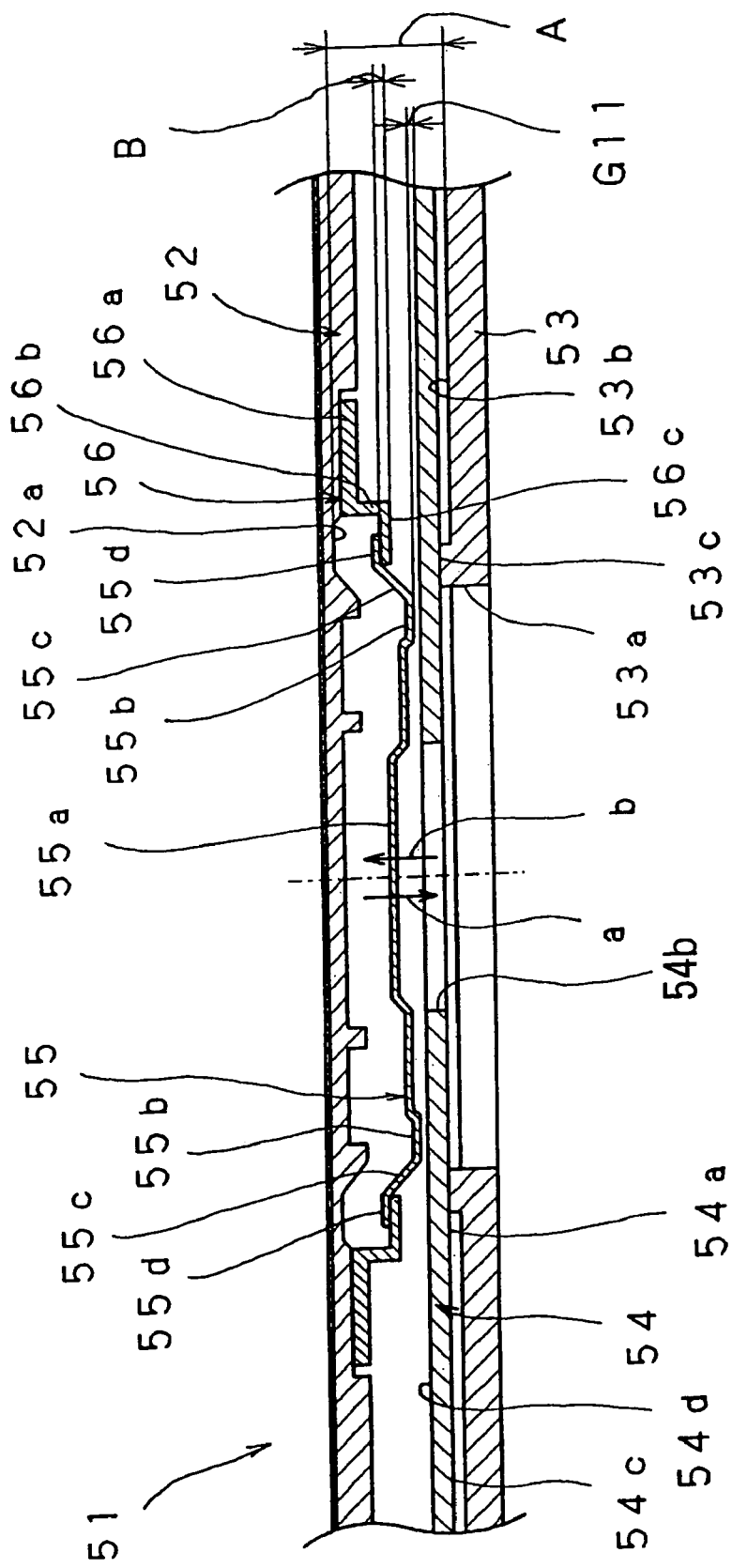
FIG. 18 is a cross-sectional side view of a conventional disk cartridge when the disk cartridge is not used.
Figure 19:
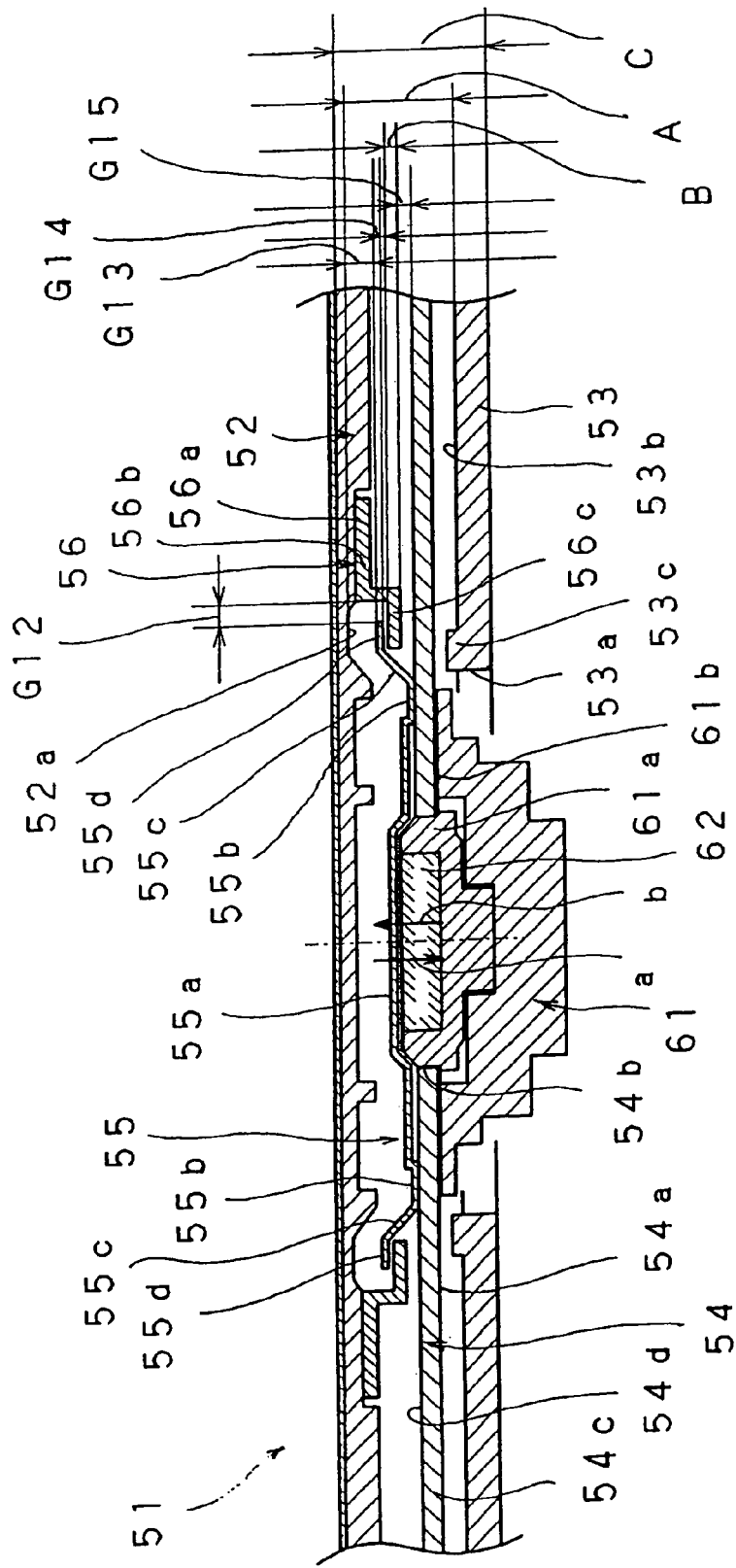
FIG. 19 is an illustration for explanation of gaps defined by a disk, a chucking plate, and an upper shell during rotation of the chucked disk in the disk cartridge shown in FIG. 18.

The disk cartridge 1 having this disk chucking structure shown in the first embodiment includes an upper shell 2 and a lower shell 3, which are molded components as in the conventional disk cartridge 51 shown in FIGS. 18 and 19. A disc 4, such as a 12 cm optical disk including a DVD or a DVD-ROM, or a magneto-optical disk, which is a disk recording medium, is horizontally accommodated inside the disk cartridge 1 so as to be rotatable and movable vertically (in the directions of the arrows a and b). An oblong opening 3a is formed in the lower shell 3 from a substantial center to a front edge thereof, and a turntable 41 and an optical pickup (not shown) described later are inserted from the bottom of the opening 3a. A chucking plate 5 composed of a ferromagnetic material such as stainless steel and formed by presswork is arranged on the middle of the disk 4 inside the disk cartridge 1.

The chucking plate 5 has a central circular recess 5a, a disk pressing portion 5b, a tapered portion 5c, and a peripheral flange 5d, which are similar to those in the conventional chucking plate and are integrated in the chucking plate 5 by presswork. A peripheral cylindrical portion 5e that is an upright portion projecting upward from the edge of the peripheral flange 5d in the vertical direction is also integrated by the presswork. The disk pressing portion 5b, which is the lowest part in the chucking plate 5, is horizontally placed in contact with the upper middle surface of the disk 4 under its own weight.

A peripheral cylindrical rib 6 is molded integral with a lower (inner) surface 2a of the upper shell 2 in the vertical direction at a location corresponding to the edge of the chucking plate 5. The peripheral cylindrical rib 6 is positioning means for the chucking plate 5 in the direction of its diameter (the direction of the arrow x) and functions as a peripheral guide. The inner diameter of a cylindrical inner surface 6a of the peripheral cylindrical rib 6 is sufficiently larger than the outer diameter of the peripheral cylindrical portion 5e of the chucking plate 5.

The chucking plate 5 is therefore accommodated rotatably in an inner region defined by the peripheral cylindrical rib 6 and movably in the vertical direction (the directions of the arrows a and b), and the chucking plate 5 is movable vertically in the directions of the arrows a and b together with the disk 4.

The peripheral cylindrical rib 6 implies that only the inner surface 6a is cylindrical and an outer surface 6b may be polygonal, not cylindrical. A plurality of vertical ribs molded integral with the lower surface 2a of the upper shell 2 of the lower shell 3 and arranged cylindrically may function as a peripheral guide.

Figure 1:
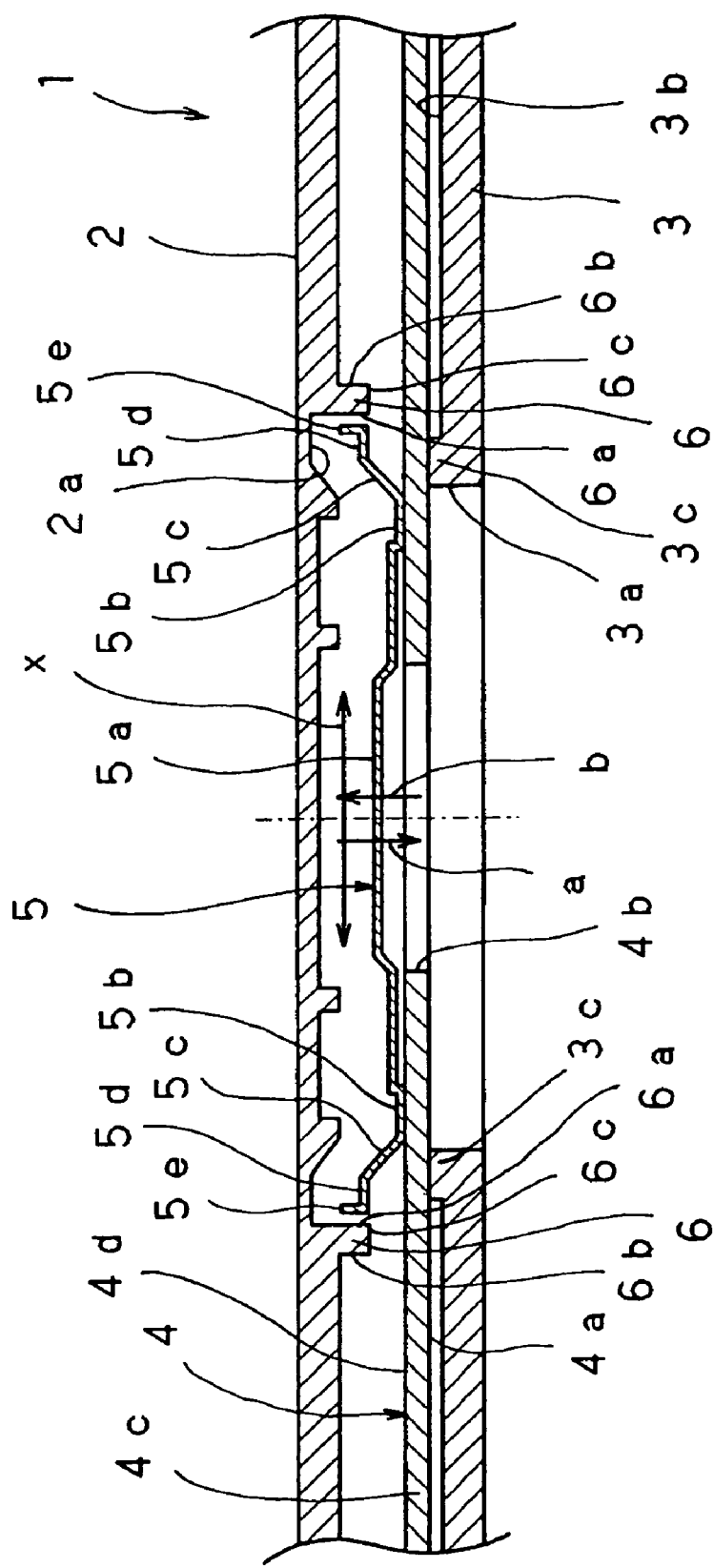
FIG. 1 is a cross-sectional side view of a disk chucking structure of a disk cartridge according to a first embodiment of the present invention when the disk cartridge is not used.

According to this disk chucking structure of the disk cartridge 1 of the first embodiment, as shown in FIG. 1, when the disk cartridge 1 is not used, the disk 4 moves down in the direction of the arrow a under its own weight. As a result, the disk 4 is horizontally placed on the lower shell 3 so that a lower surface 4a of the disk 4 at an outer region of the center hole 4b comes into contact with the upper (inner) surface 3b of the lower shell 3 at an inner rib 3c molded integral with the outer region of the opening 3a, and a data recording region 4c is distant from the upper surface 3b of the lower shell 3.

The chucking plate 5 in an inner region defined by the peripheral cylindrical rib 6 moves down in the direction of the arrow a under its own weight together with the disk 4.

Figure 2:
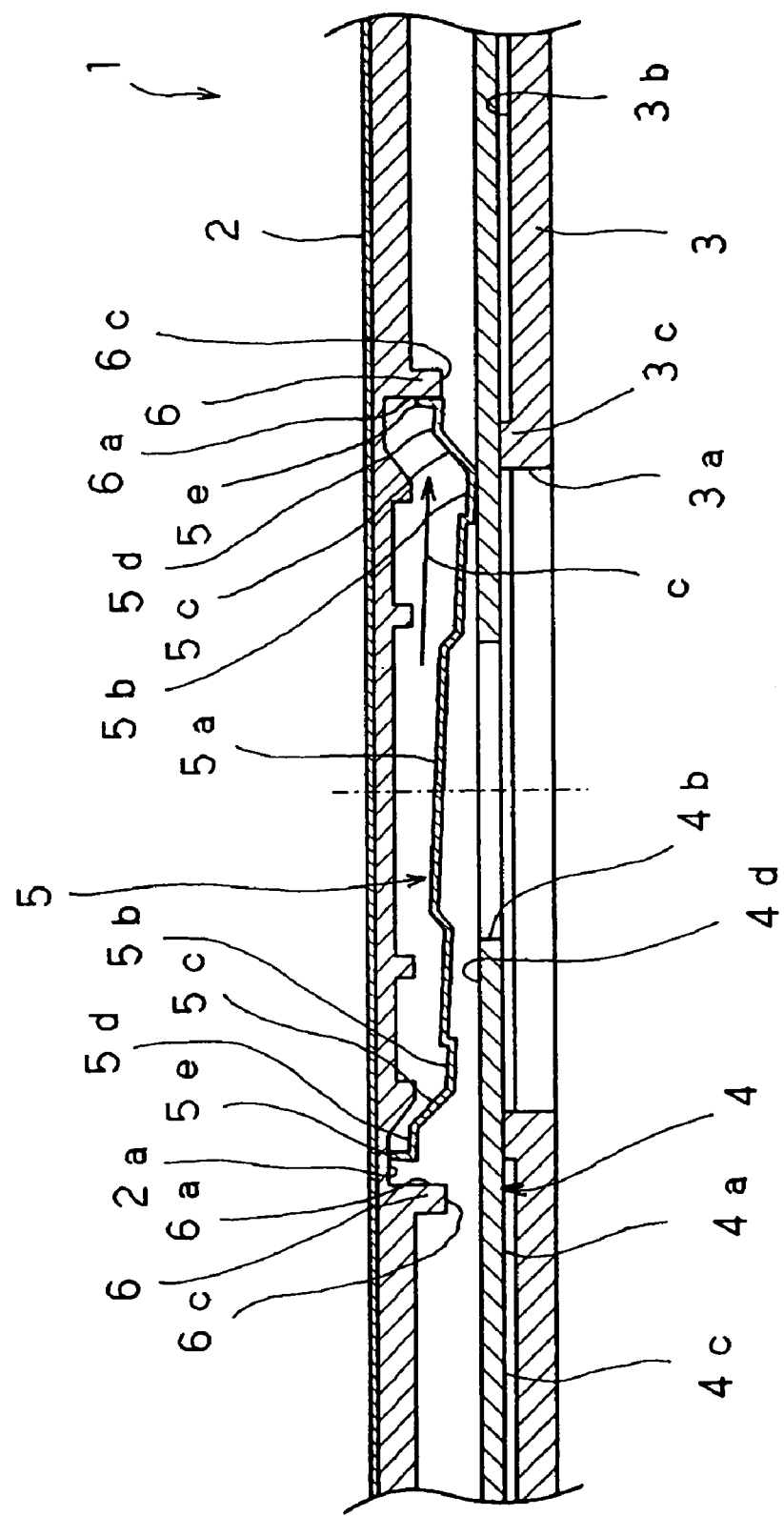

As shown in FIG. 2, according to this disk chucking structure of the first embodiment, the peripheral cylindrical portion 5e projects upward from the edge of the peripheral flange 5d of the chucking plate 5 in the vertical direction. Therefore, when the chucking plate 5 inside the disk cartridge 1 is inclined in the direction of the arrow c due to vibration or shock in transit of the disk cartridge 1, the peripheral cylindrical portion 5e of the chucking plate 5 partly comes into contact with the inner surface 6a of the peripheral cylindrical rib 6 of the upper shell 2. A location of the chucking plate 5 is thus limited. Accordingly, the chucking plate 5 is not accidentally fitted into a space between the bottom end surface 6c of the peripheral cylindrical rib 6 and an upper surface 4d of the disk 4.

Figure 3:
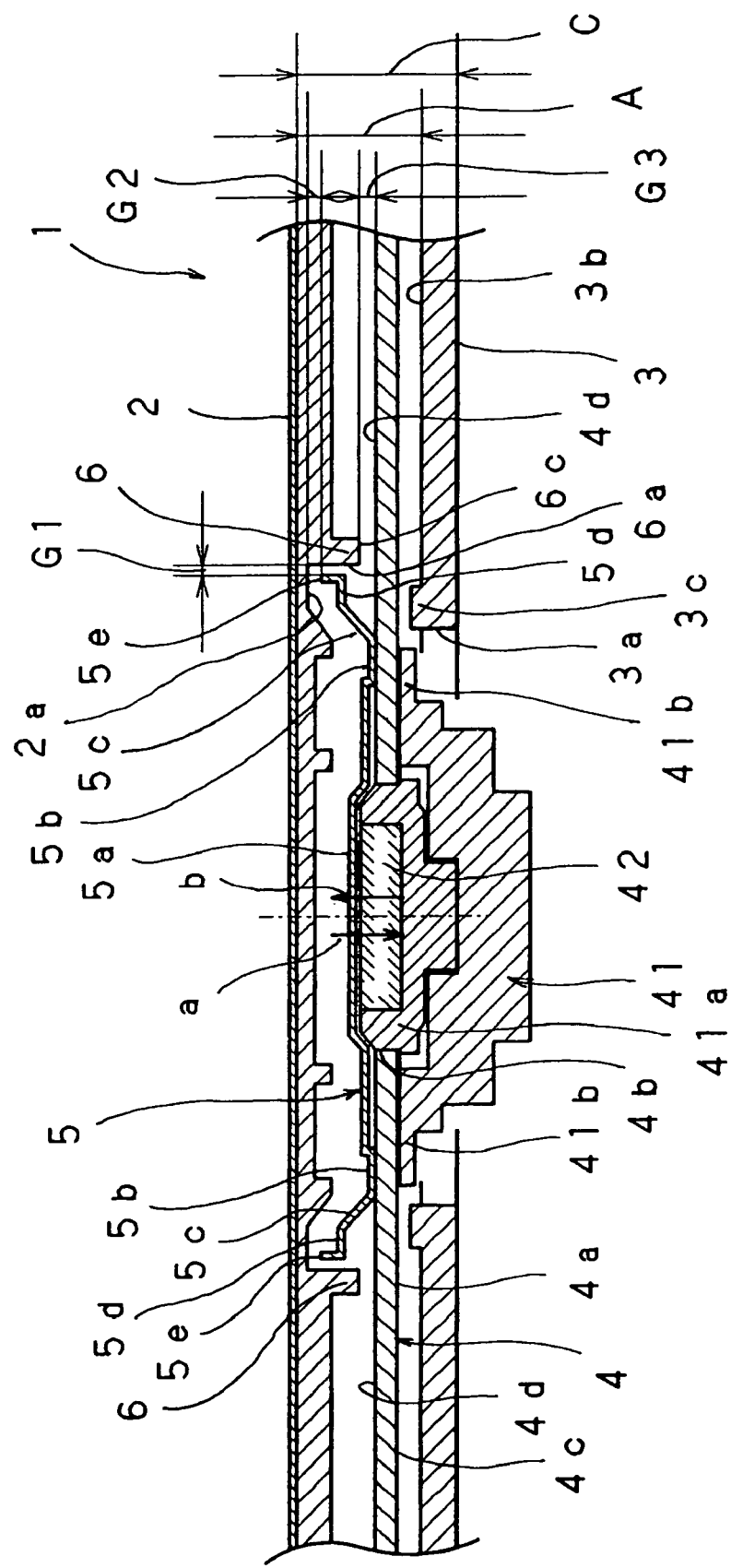
FIG. 3 is an illustration for explanation of gaps defined by the disk, the chucking plate, and the upper shell during rotation of the chucked disk in the disk cartridge shown in FIG. 1.

As shown in FIG. 3, according to this disk chucking structure of the first embodiment, when the disk cartridge 1 is loaded into a disk drive device (not shown), the turntable 41 driven by a spindle motor (not shown) and the optical pickup (not shown) are inserted into the opening 3a of the lower shell 3 from below relatively in the direction of the arrow b.

A centering projection 41a formed in a central upper part of the turntable 41 and having the shape of a substantially truncated cone is then inserted into the center hole 4b of the disk 4 from the direction of the arrow b. The disk 4 is thus centered and the lower surface 4a of the disk 4 at the outer region around the center hole 4b is horizontally placed on an annular disk mounting face 41b that is horizontally formed at an outer region of the turntable 41. The disk 4 is then moved up relatively in the direction of the arrow b to a substantial middle position between the upper shell 2 and the lower shell 3 in the disk cartridge 1 by the turntable 41. The disk 4 and the chucking plate 5 are supported not in contact with the upper shell 2 or the lower shell 3. The optical pickup approaches the lower surface 4a of the disk 4.

At this time, a circular chucking magnet 42 mounted into the center of the centering projection 41a of the turntable 41 is inserted into an inner region defined by the central circular recess 5a of the chucking plate 5 from the direction of the arrow b, and the chucking magnet 42 approaches the chucking plate 5.

The chucking plate 5 is then attracted in the direction of the arrow a by magnetic attraction of the chucking magnet 42. As a result, the annular disk pressing portion 5b of the chucking plate 5 crimps the upper surface 4d of the disk 4 at the outer region around the center hole 4b onto the annular disk mounting face 41b of the turntable 41 from the direction of the arrow a and fixes it, i.e., the disk 4 is chucked.

The disk 4 is then driven to be rotated by the spindle motor with the turntable 41 inside the disk cartridge 1. In recording data to and/or playing back data from the data recording region 4c of the disk 4 by the optical pickup, the chucking plate 5 not in contact with the upper shell 2 or the peripheral cylindrical rib 6 is rotated together with the disk 4.

During this rotation of the chucked disk, three gaps are defined by the disk 4, the chucking plate 5, and the upper shell 2: a gap G1 is defined between the top end of the peripheral cylindrical portion 5e of the chucking plate 5 and the inner surface 6a of the peripheral cylindrical rib 6 in the horizontal direction; a gap G2 is defined between the top end of the peripheral cylindrical portion 5e and the lower surface 2a of the upper shell 2 in the vertical direction; and a gap G3 is defined between the bottom end surface 6c of the peripheral cylindrical rib 6 and the upper surface 4d of the disk 4 in the vertical direction.

According to this disk chucking structure of the disk cartridge 1 of the first embodiment, there is no need to consider the thickness B of the inner flange 56c of the conventional plate supporter 56 shown in FIG. 19 within the inner thickness A defined between the lower surface 2a of the upper shell 2 and the upper surface 3b of the lower shell 3 in the vertical direction.

As shown in FIG. 3, gaps to be considered defined between the upper shell 2 and the disk 4 in the vertical direction during the rotation of the chucked disk are only two gaps: the gap G2 defined between the upper shell 2 and the chucking plate 5; and the gap G3 defined between the peripheral cylindrical rib 6 and the disk 4. Accordingly, each of these two gaps G2 and G3 can be sufficiently larger than each of the three vertical gaps G13, G14, and G15 shown in FIG. 19.

When these two gaps G2 and G3 are sufficiently large, the chucking plate 5 tends to be not in contact with the upper shell 2 in the gap G2 and the disk 4 tends to be not in contact with the peripheral cylindrical rib 6 in the gap G3 when the disk 4 and the chucking plate 5 are driven to be rotated together with the turntable 41 by the spindle motor. This leads to increased reliability. Additionally, a decrease in the reliability resulting from shrinkage or expansion with environmental variations, such as temperature or humidity variations, can be suppressed.

Because of having the shape of a cylinder simply, the peripheral cylindrical rib 6 can be readily molded integral with the upper shell 2. This molding of the peripheral cylindrical rib 6 integral with the upper shell 2 incurs no additional cost.

With FIGS. 4 to 6, a disk chucking structure according to the second embodiment will now be described.

This disk chucking structure of the second embodiment differs from that of the first embodiment in that a peripheral cylindrical portion 5f that is a pendent portion projecting downward in the vertical direction from the edge of the peripheral flange 5d of the chucking plate 5 is integrally provided by presswork. The other arrangements are the same.

Figure 4:
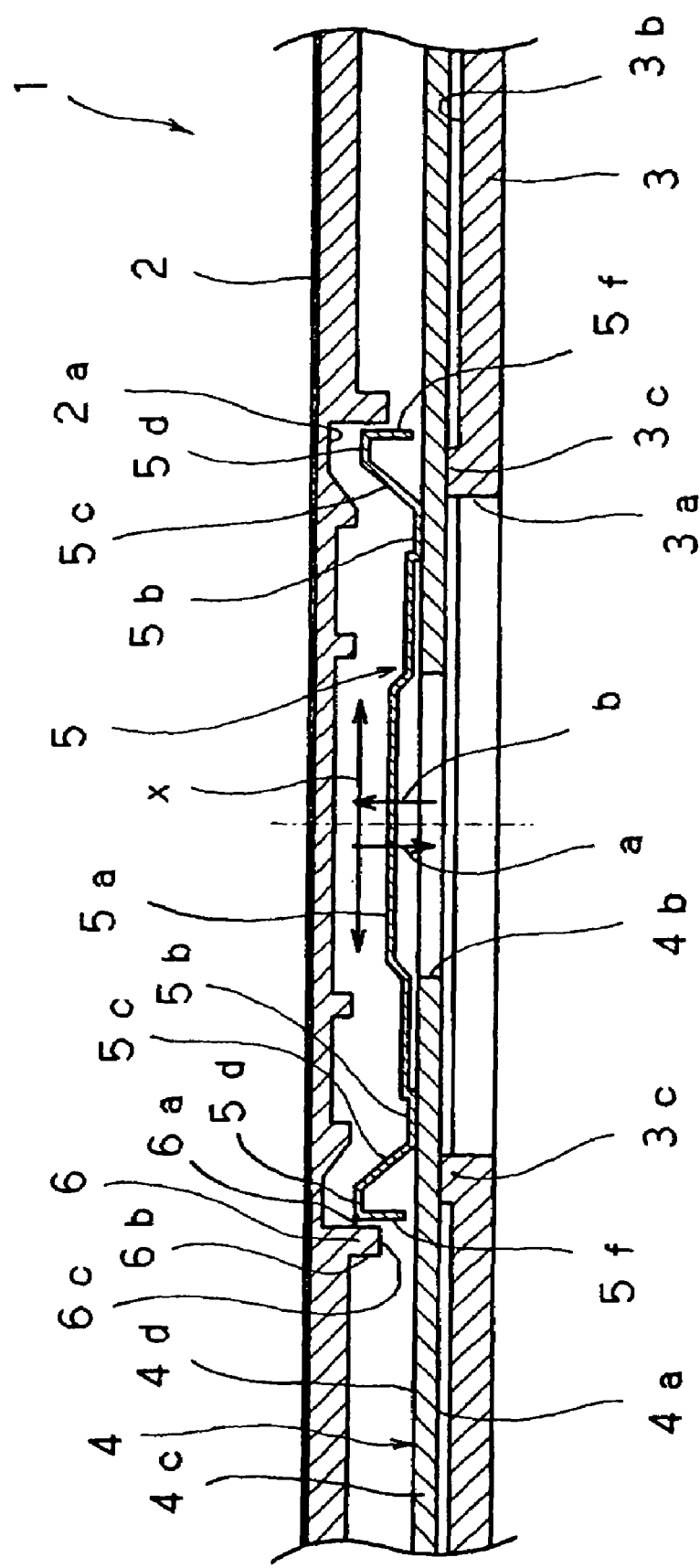
FIG. 4 is a cross-sectional side view of a disk chucking structure of a disk cartridge according to a second embodiment of the present invention when the disk cartridge is not used.

Therefore, as shown in FIG. 4, when the disk cartridge 1 is not used, the chucking plate 5 is accommodated so as to be rotatable in an inner region defined by the peripheral cylindrical rib 6 and movable vertically (in the directions of the arrows a and b) and the chucking plate 5 is placed directly on the middle of the upper surface 4d of the disk 4 under its own weight.

Figure 5:
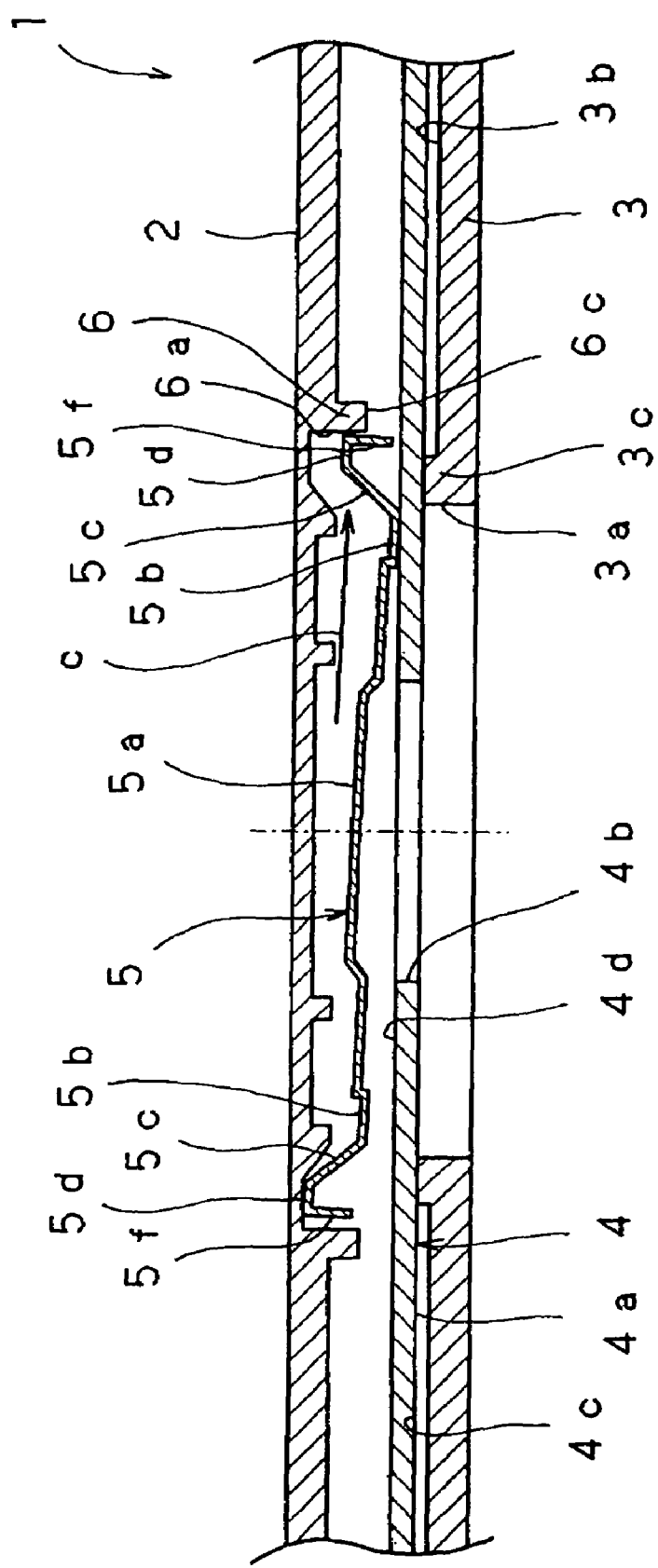

As shown in FIG. 5, according to this disk chucking structure of the second embodiment, the peripheral cylindrical portion 5f projects downward in the vertical direction from the edge of the peripheral flange 5d of the chucking plate 5. Therefore, when the chucking plate 5 inside the disk cartridge 1 is inclined in the direction of the arrow c due to vibration or shock in transit of the disk cartridge 1, the peripheral cylindrical portion 5f of the chucking plate 5 partly comes into contact with the inner surface 6a of the peripheral cylindrical rib 6 of the upper shell 2. A location of the chucking plate 5 is thus limited. As a result, the chucking plate 5 is not accidentally fitted into a space between the bottom end surface 6c of the peripheral cylindrical rib 6 and the upper surface 4d of the disk 4.

Figure 6:
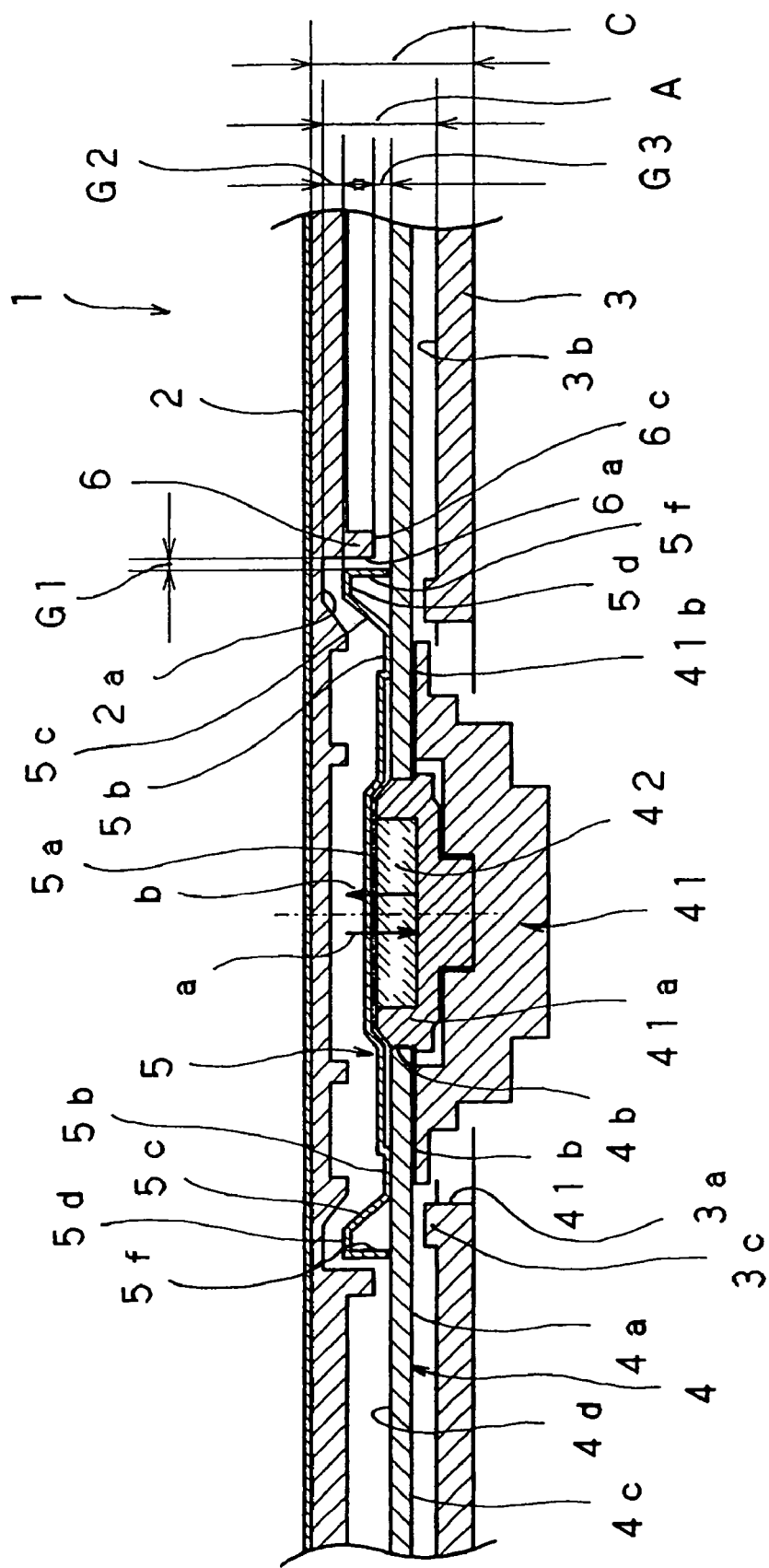
FIG. 6 is an illustration for explanation of gaps defined by the disk, the chucking plate, and the upper shell during rotation of the chucked disk in the disk cartridge shown in FIG. 4.

According to this disk chucking structure of the disk cartridge 1 of the second embodiment, as shown in FIG. 6, gaps to be considered defined between the upper shell 2 and the disk 4 in the vertical direction during the rotation of the chucked disk are only two gaps: the gap G2 defined between the upper shell 2 and the chucking plate 5; and the gap G3 defined between the peripheral cylindrical rib 6 and the disk 4, as in the case with the first embodiment. Accordingly, these two gaps G2 and G3 can be sufficiently large, as described above.

Therefore, the advantageous effect similar to that of the first embodiment is achieved.

Figure 7:
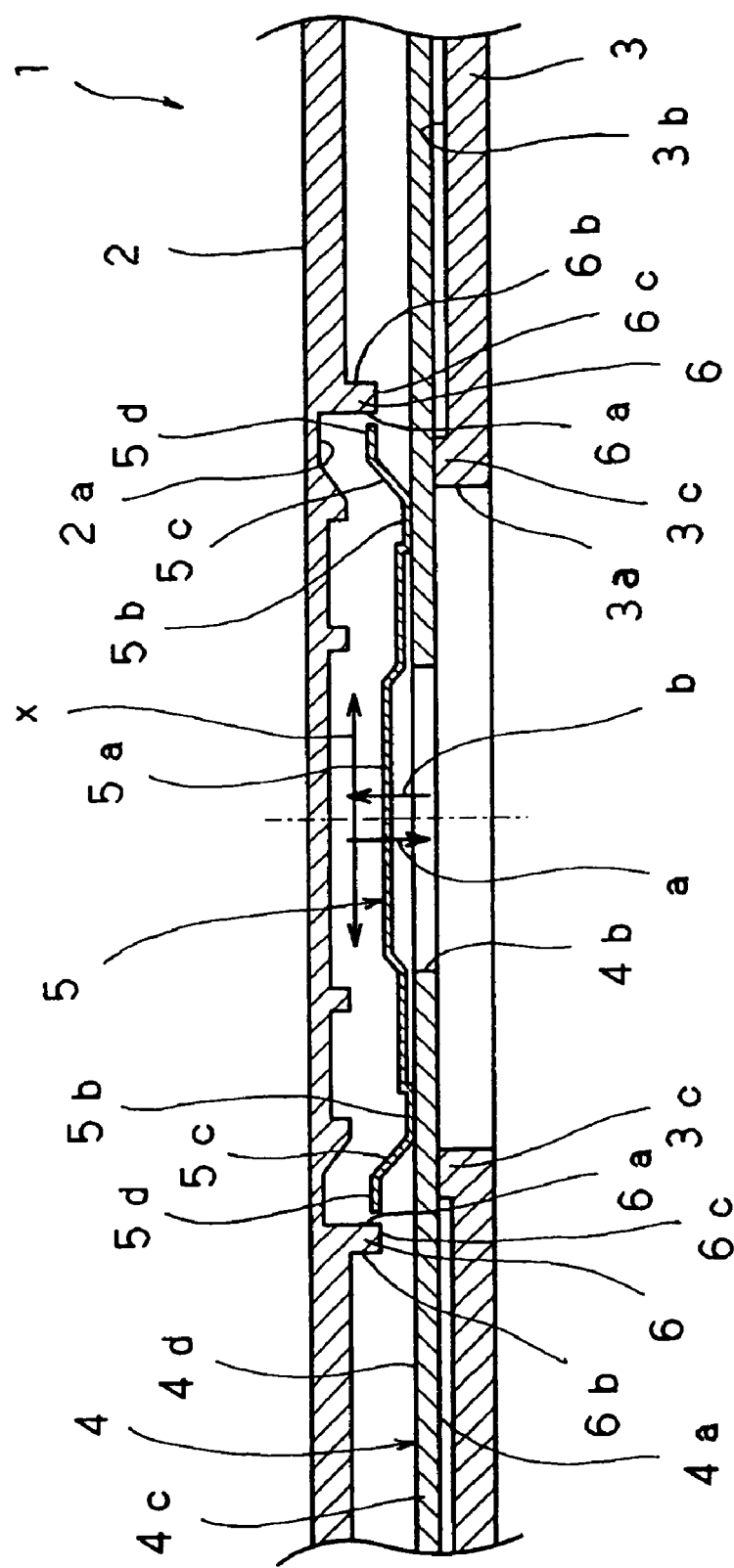
FIG. 7 is a cross-sectional view of a disk chucking structure of a disk cartridge according a third embodiment of the present invention when the disk cartridge is not used.

With FIGS. 7 and 8, a disk chucking structure according to the third embodiment will now be described.

This disk chucking structure of the third embodiment does not have the peripheral cylindrical portions 5e and 5f, which are described in the first and second embodiments, respectively, outside the peripheral flange 5d of the chucking plate 5.

Figure 8:
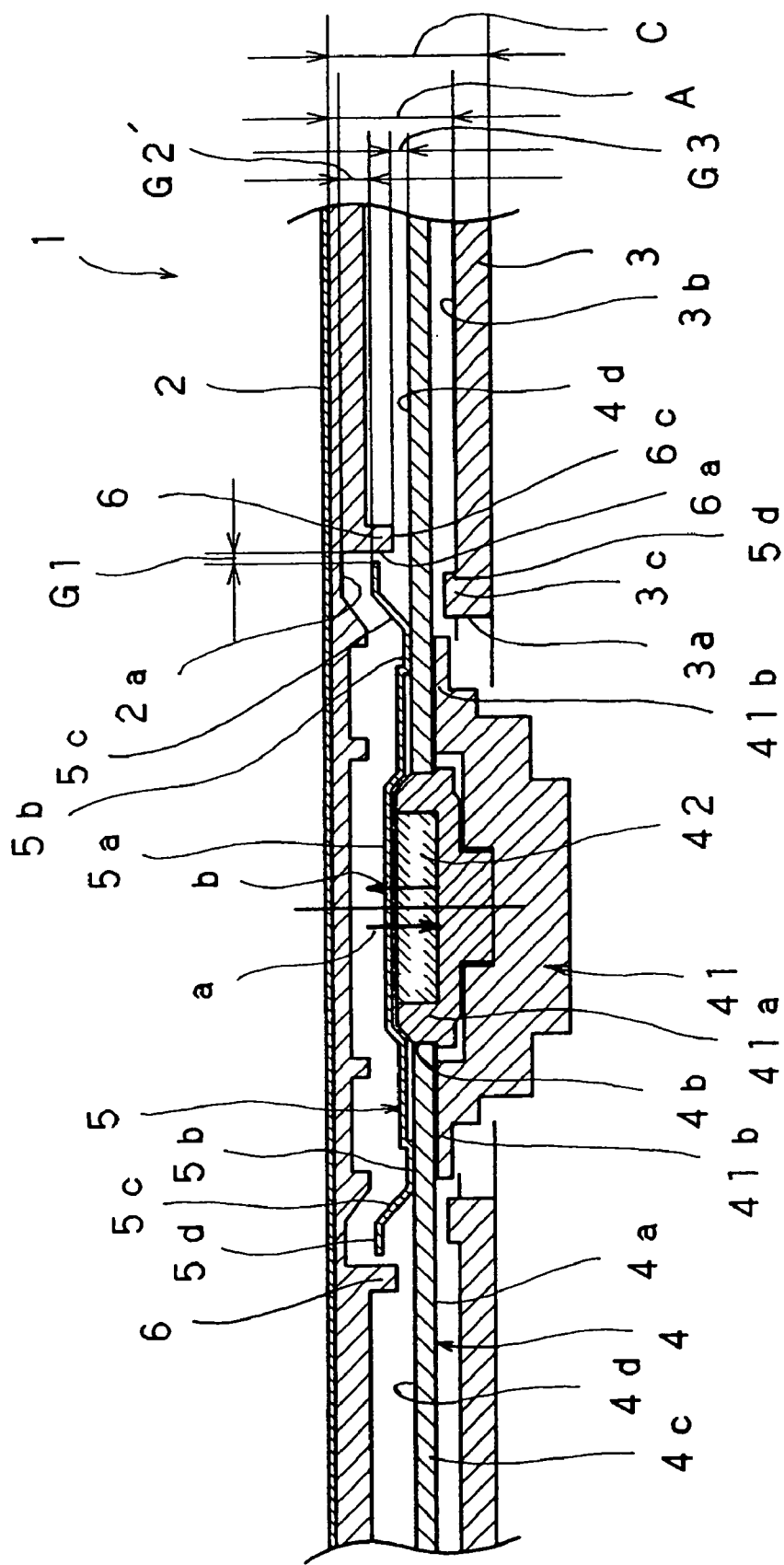
FIG. 8 is an illustration for explanation of gaps defined by the disk, the chucking plate, and the upper shell during rotation of the chucked disk in the disk cartridge shown in FIG. 7.

According to this disk chucking structure of the third embodiment, as shown in FIG. 8, the peripheral cylindrical portion 5e and the peripheral cylindrical portion 5f are not provided so that a gap G2' defined between the lower surface 2a of the upper shell 2 and the peripheral flange 5d of the chucking plate 5 in the vertical direction can be larger than the gap G2 described in the first and second embodiments.

When the gap G2' is larger, the chucking plate 5 tends to be not in contact with the upper shell 2 in the gap G2' while the disk 4 and the chucking plate 5 are driven to be rotated together with the turntable 41 by the spindle motor during the rotation of the chucked disk. This leads to further increased reliability. Additionally, a decrease in the reliability resulting from shrinkage or expansion with environmental variations, such as temperature or humidity variations, can be further suppressed.

With FIGS. 9 and 10, a disk chucking structure according to the fourth embodiment will now be described.

In this disk chucking structure of the fourth embodiment, a central guide pin 7 is molded integral with the lower surface 2a of the upper shell 2 in the vertical direction above the center of the chucking plate 5. The central guide pin 7 is positioning means for the chucking plate 5 in the direction of its diameter (in the direction of the arrow x) and functions as a central guide.

A central cylindrical portion 5g is concentrically and cylindrically formed by burring or the like in the central upper part of the chucking plate 5 and is disposed around the edge of the central guide pin 7. The inner dimension of the central cylindrical portion 5g is larger than the dimension of the diameter of the central guide pin 7.

Therefore, the chucking plate 5 is accommodated around the periphery of the central guide pin 7 so as to be rotatable and vertically movable.

Figure 9:
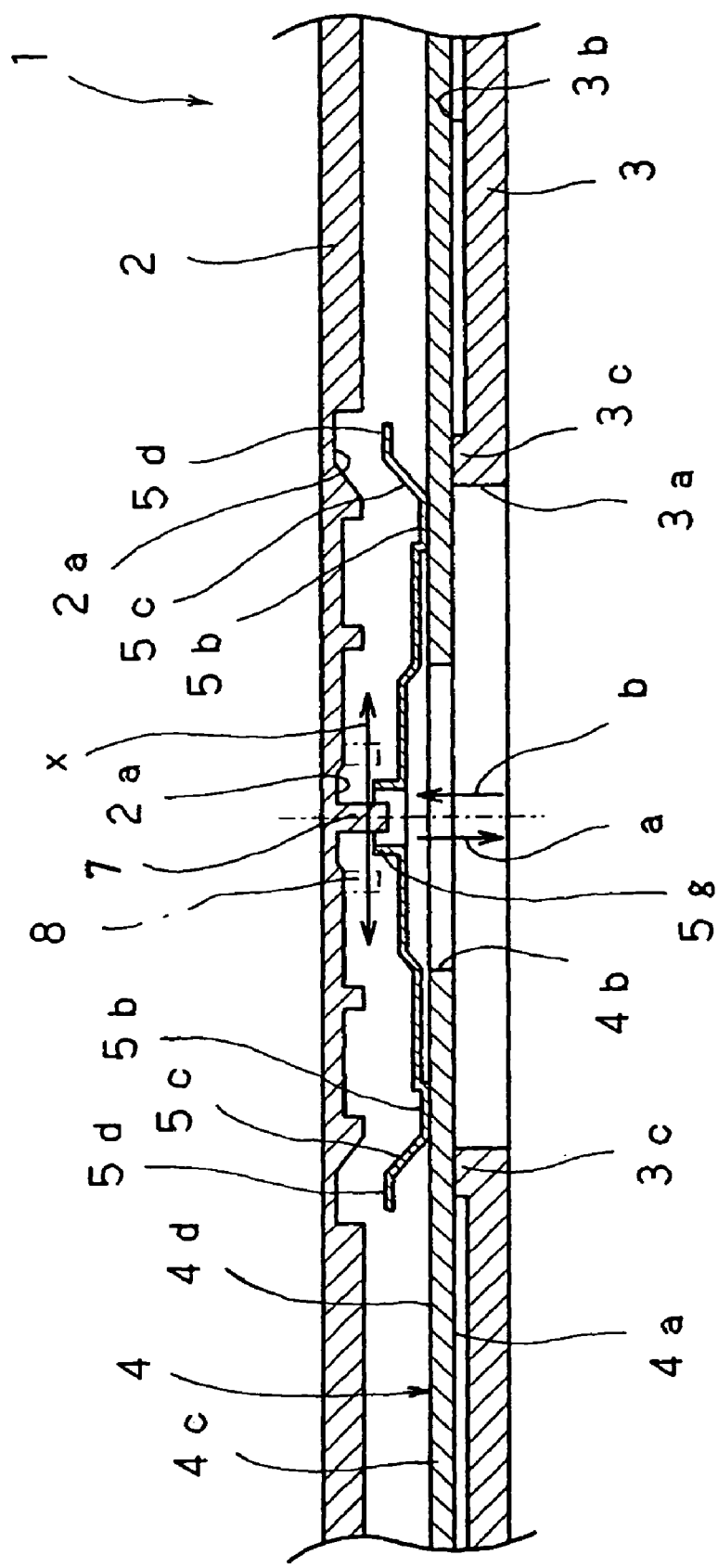
FIG. 9 is a cross-sectional view of a disk chucking structure of a disk cartridge according to a fourth embodiment of the present invention when the disk cartridge is not used.

As shown in FIG. 9, according to this chucking structure of the fourth embodiment, when the disk cartridge 1 is not used, the chucking plate 5 moves down in the direction of the arrow a toward the bottom end of the central guide pin 7 and is placed directly on the middle of the upper surface 4d of the disk 4.

Figure 10:
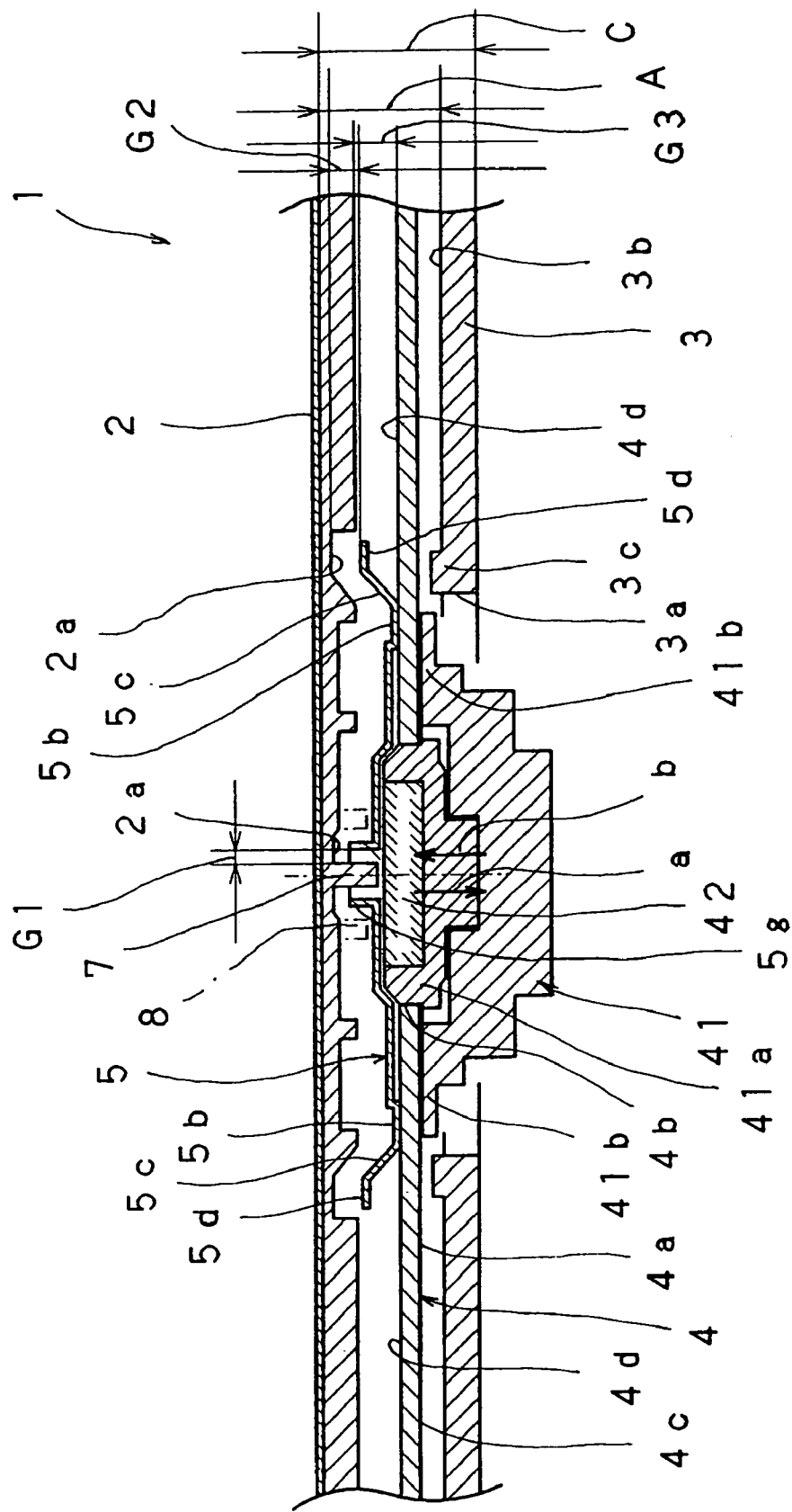
FIG. 10 is an illustration for explanation of gaps defined by the disk, the chucking plate, and the upper shell during rotation of the chucked disk in the disk cartridge shown in FIG. 9.
Figure 11:
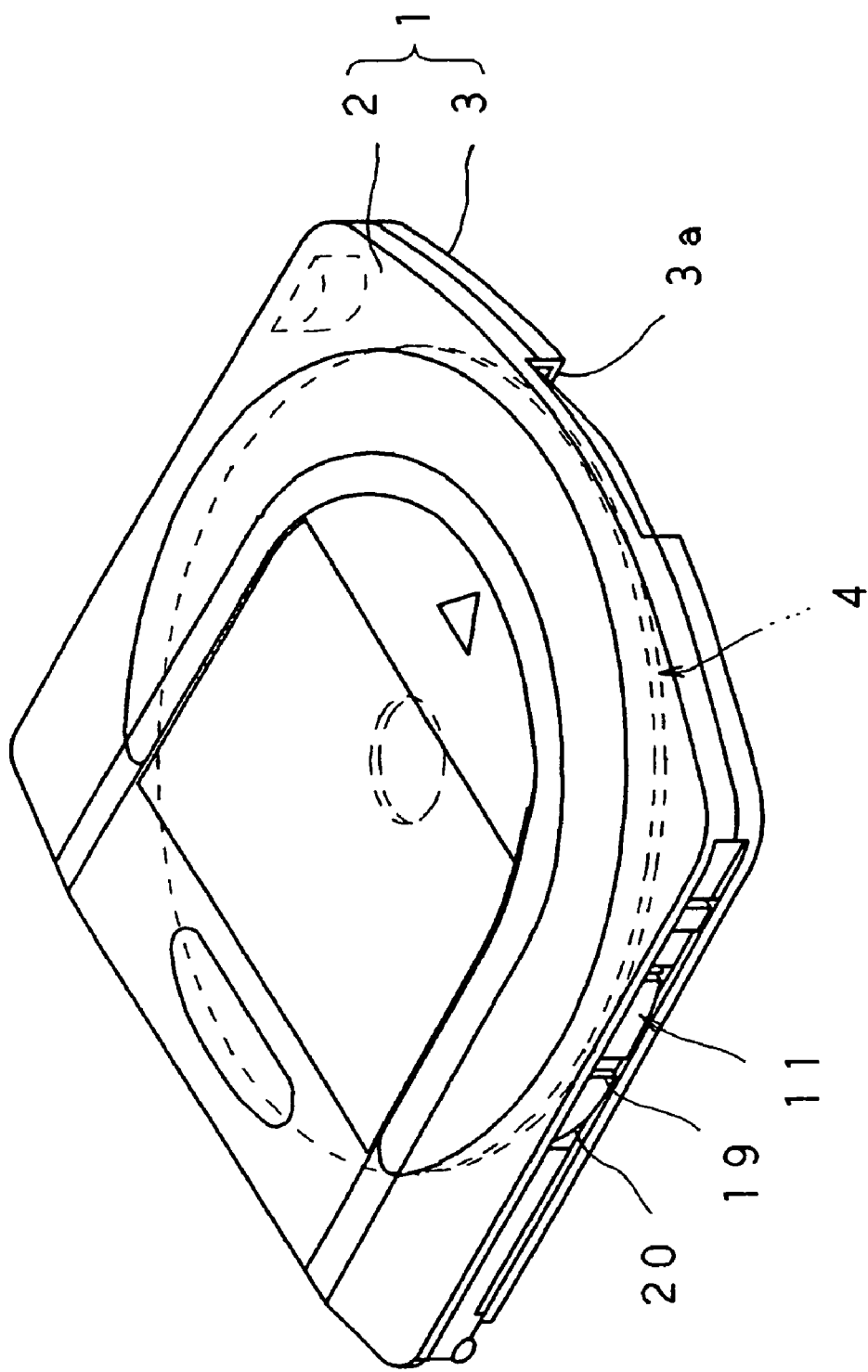
FIG. 11 is a schematic perspective view of the entire disk cartridge according to the present invention.
Figure 12:
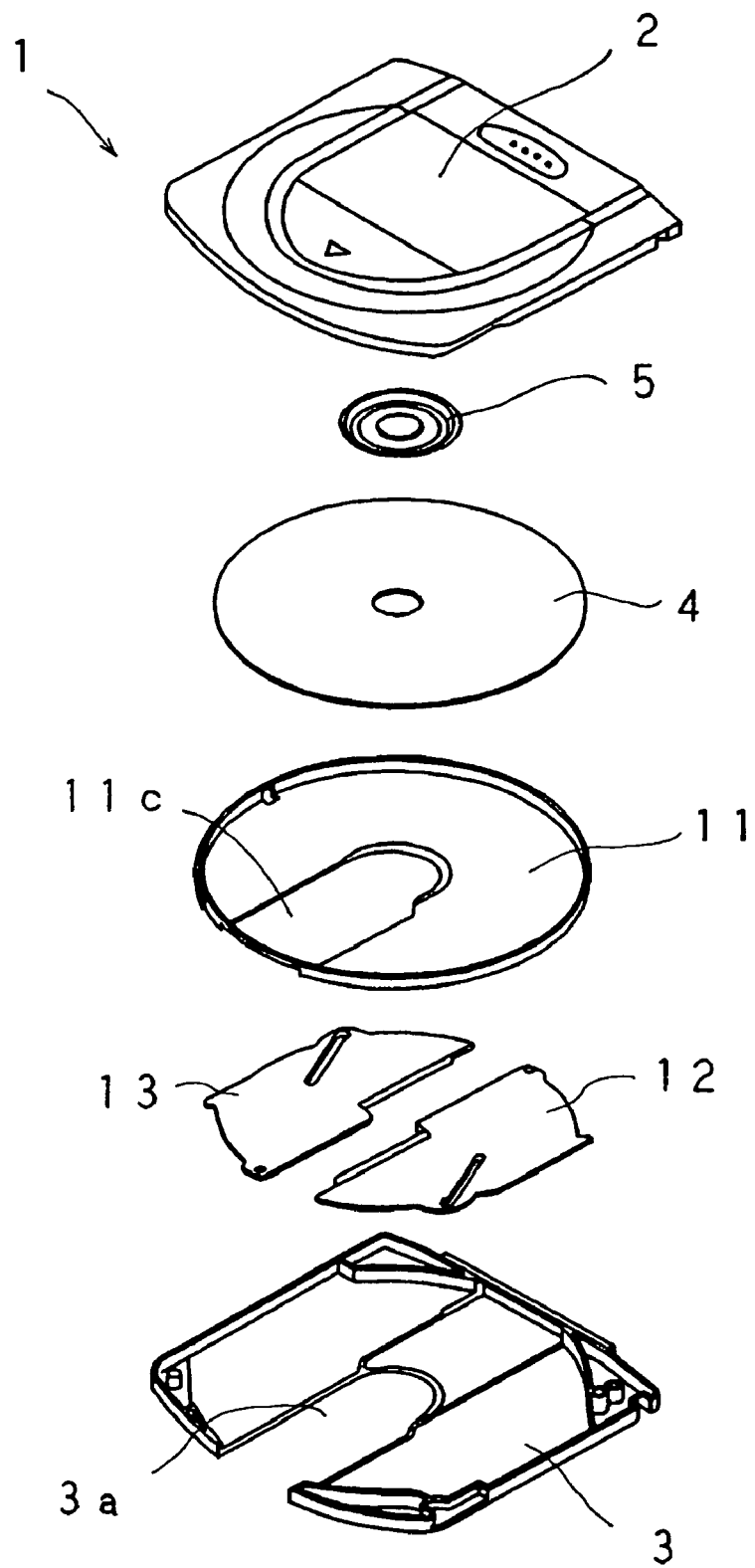
FIG. 12 is an exploded perspective view of the parts of the disk cartridge shown in FIG. 11.
Figure 13:
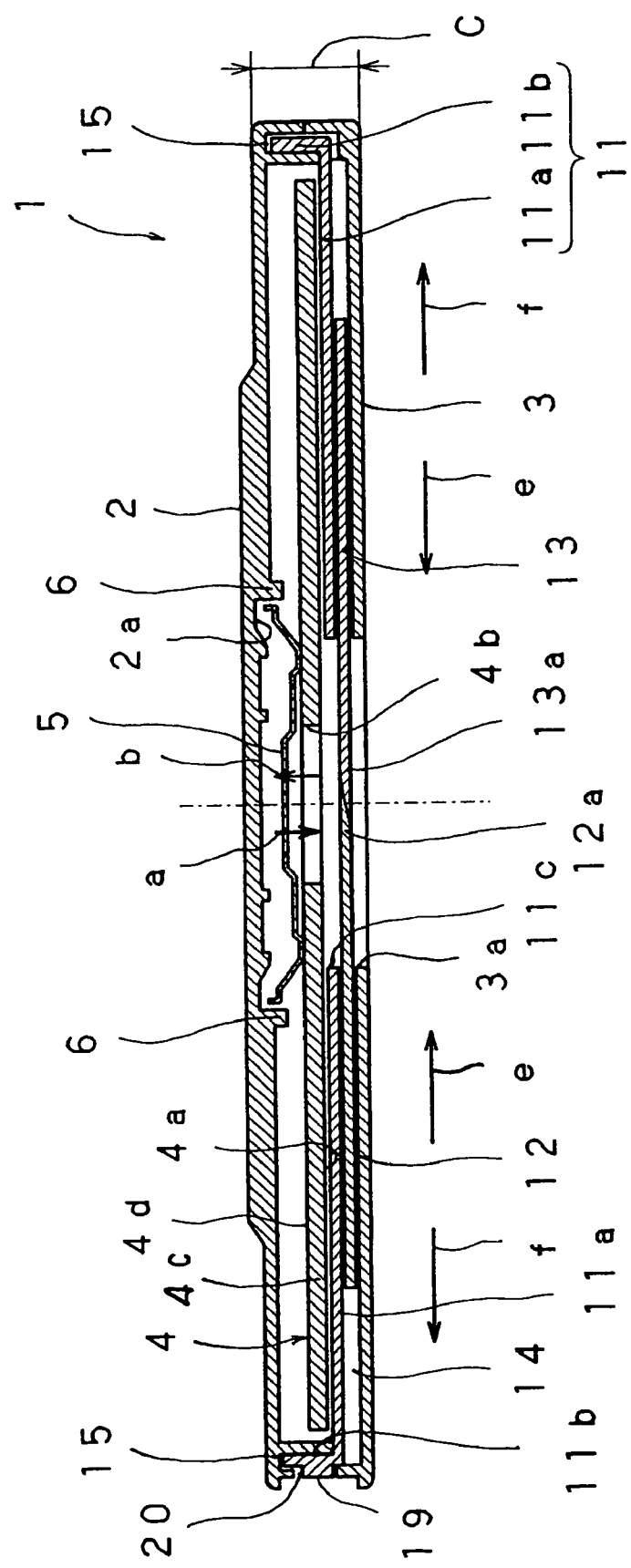
FIG. 13 is a cross-sectional side view of the disk cartridge shown in FIG. 11.

As shown in FIG. 10, during-the rotation of the chucked disk, the disk 4 subjected to chucking on the turntable 41 by the chucking plate 5 and the chucking plate 5 in the disk cartridge 1 are moved up in the direction of the arrow b. At this time, the central cylindrical portion 5g of the chucking plate 5 is moved up toward the top end of the central guide pin 7, maintaining that the inner surface of the central cylindrical portion 5g is not in contact with the periphery of the central guide pin 7 by the horizontal gap G1. The gap G2 is provided between the top end of the central cylindrical portion 5g and the upper shell 2, and the gap G3 is provided between the bottom end of the central guide pin 7 and the chucking magnet 42. Therefore, the advantageous effects similar to those of the first to third embodiments are achieved.

As shown by a chain line in FIGS. 9 and 10, the central guide pin 7 molded integral with the lower surface 2a of the upper shell 2 and functioning as a central guide may be substituted by a central cylindrical portion 8 molded integral with the lower surface 2a of the upper shell 2. The central cylindrical portion 5g of the chucking plate 5 is inserted into the bottom end of an inner region defined by the central cylindrical portion 8 from below and the inner dimension of the central cylindrical portion 8 is larger than the outer dimension of the central cylindrical portion 5g. The central cylindrical portion 5g is rotatable and vertically movable in the inner region defined by the central cylindrical portion 8. In this way, the advantageous effects similar to those of the first to third embodiments are achieved.

(2) Explanation of an Outline of the Overall Disk Cartridge

With FIGS. 11 to 19, the outline of the overall disk cartridge 1 including an inner rotor having the disk chucking structures described above will now be described below.

This disk cartridge 1 has the inner rotor 11 of a molded component or the like and the pair of shutters 12 and 13 that are molded components or the like. The pair of shutters 12 and 13 are mounted on the lower surface of the inner rotor 11 so as to be rotatable, and they can open and close the opening 3a of the lower shell 3 by rotation of the inner rotor 11. The inner rotor 11 having the shape of a circular disk has a disk bottom 11a and a cylindrical outer wall 11b that projects upward from the edge of the bottom 11a in the vertical direction. The bottom 11a has an opening 11c having substantially the same shape as the opening 3a of the lower shell 3. The inner rotor 11 is horizontally placed above the lower shell 3 by a gap 14 so as to be rotatable, and the outer wall 11b is rotatably disposed inside a cylindrical slot 15 formed in the periphery defined between the upper shell 2 and the lower shell 3.

The disk 4 is horizontally placed on the bottom 11a of the inner rotor 11 so as to be rotatable and vertically movable.

The pair of shutters 12 and 13 have individually lamelliform structures having the substantial half-round shape. The pair of shutters 12 and 13 are symmetrically positioned at the opposite sides of the opening 11c below the lower surface of the bottom 11a of the inner rotor 11, and opposite ends of the pair of shutters 12 and 13 are attached to the bottom 11a of the inner rotor 11 with a pair of points 16 so as to be pivotable. A pair of cam slits 17 symmetrically formed opposite to the points 16 receive a pair of cam pins 18 molded integral with the upper surface 3a of the lower shell 3 so as to be slidable.

An inner rotor rotation driver 19 having a component gear molded integral with an outer face of the outer wall 11b of the inner rotor 11 is partly exposed through a slot window 20 formed at one side of both the upper shell 2 and the lower shell 3. The inner rotor rotation driver 19 is driven to be rotated by an inner rotor rotation driver member (not shown), such as a rack, from outside the window 20 in the directions of the arrows c and d so that the opening 3a of the lower shell 3 can be opened and closed by the pair of shutters 12 and 13.

Figure 14:
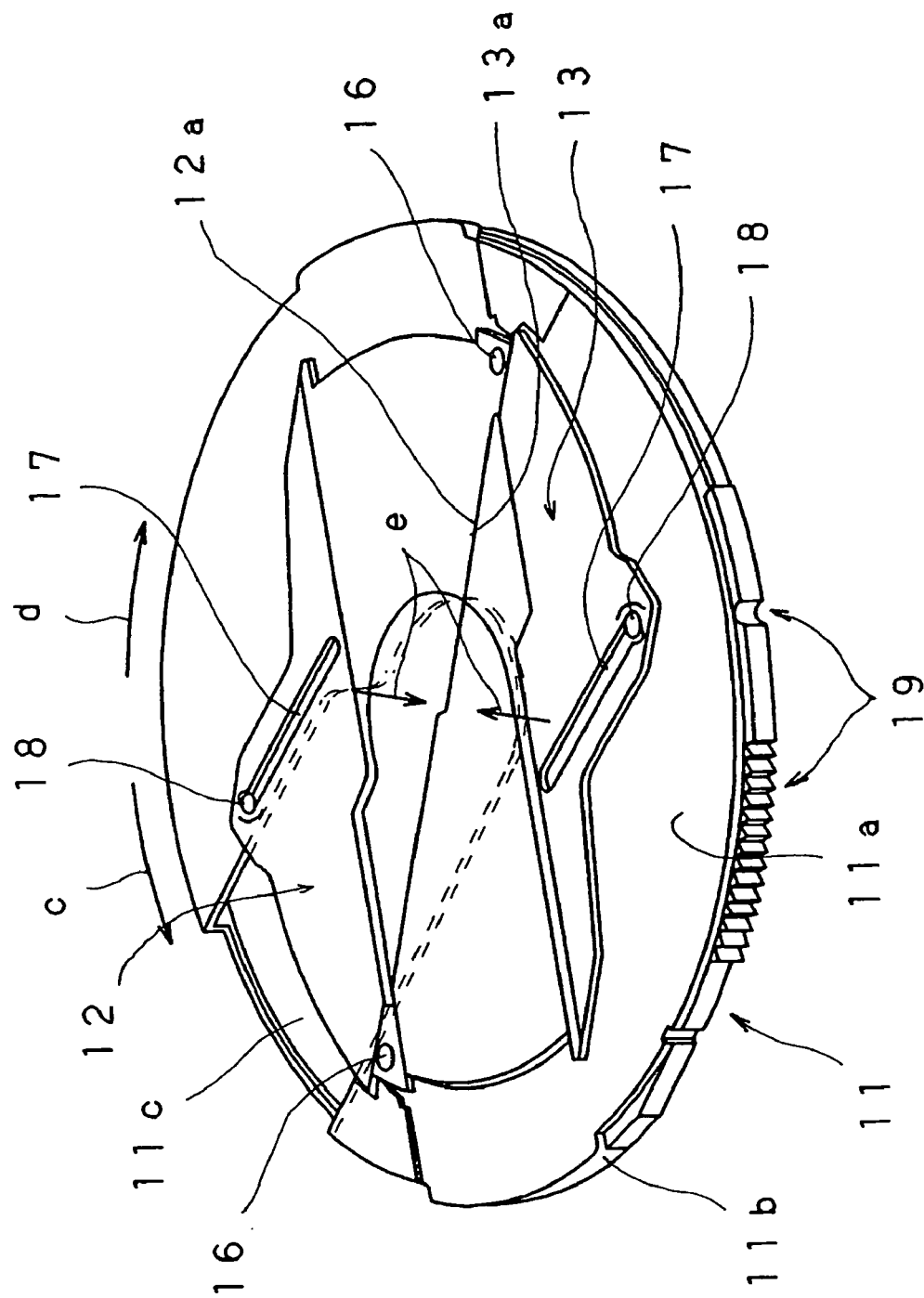
FIG. 14 is a perspective view of the disk cartridge shown in FIG. 11 when an inner rotor and a pair of shutters are closed, viewed from the bottom.
Figure 16:
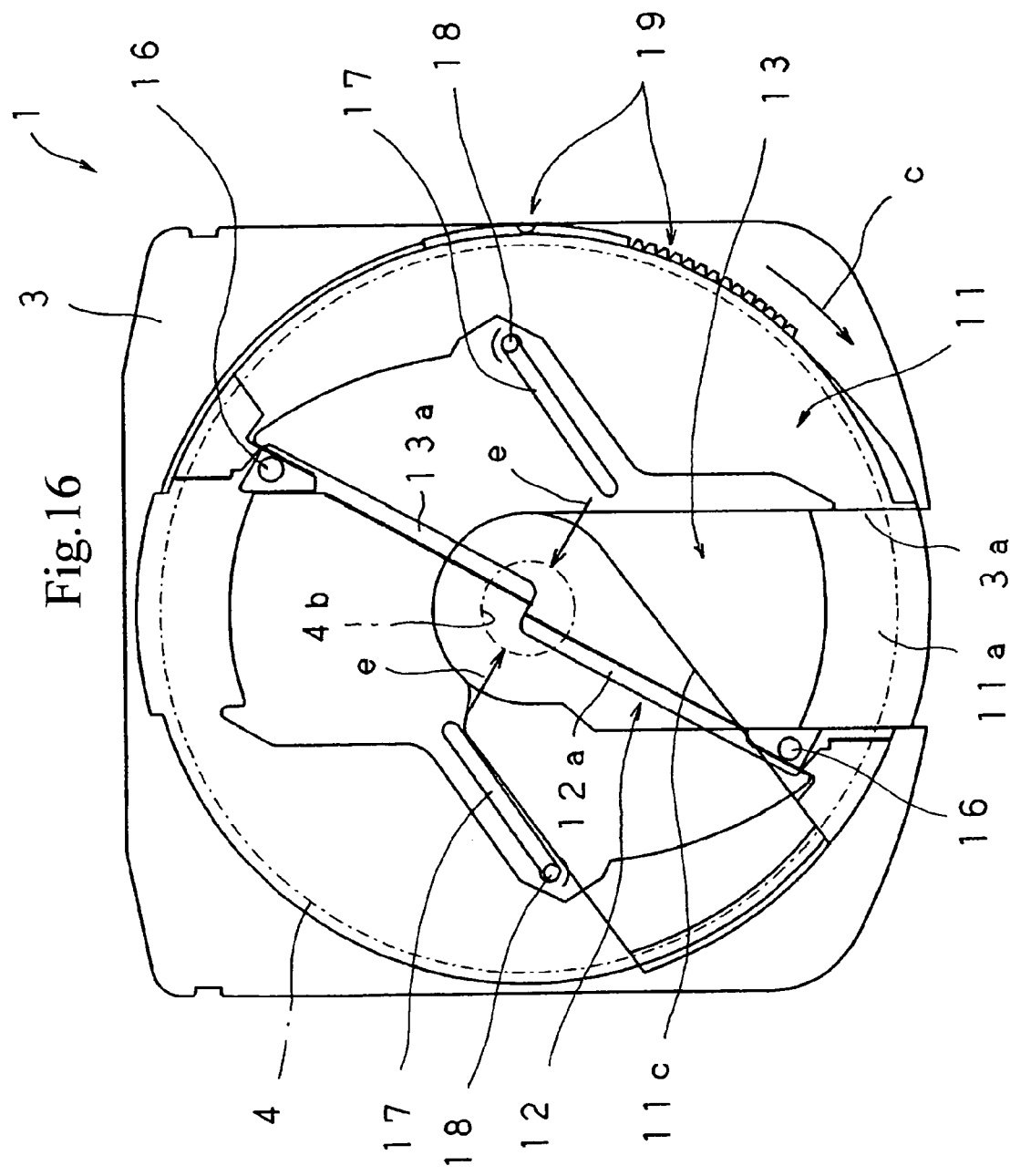
FIG. 16 is a bottom perspective view of the disk cartridge shown in FIG. 11 when an opening of a lower shell is closed by the inner rotor and the pair of shutters.

FIGS. 14 and 16 show a state where the shutters are closed. In this state, the inner rotor 11 is rotated in the direction of the arrow c and the opening 11c of the inner rotor 11 deviates by a predetermined angle from the opening 3a of the lower shell 3 in the direction of the arrow c and the pair of shutters 12 and 13 are closed from the direction of the arrow e around the points 16 so that the opening 3a of the lower shell 3 is closed by a part of the bottom 11a of the inner rotor 11 and a part of the pair of shutters 12 and 13.

Figure 15:
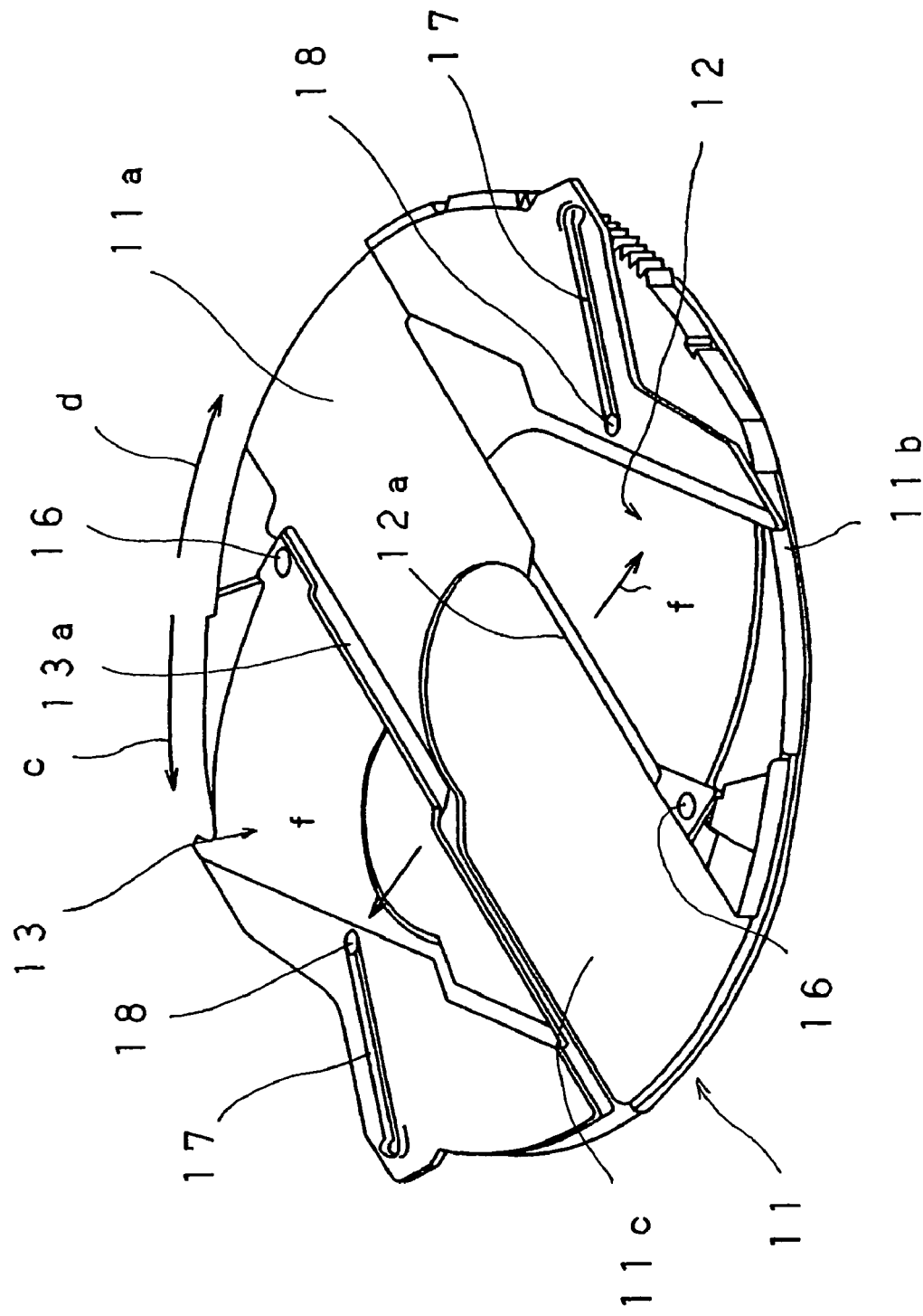
FIG. 15 is a perspective view of the disk cartridge shown in FIG. 11 when the inner rotor and the pair of shutters are opened, viewed from the bottom.
Figure 17:
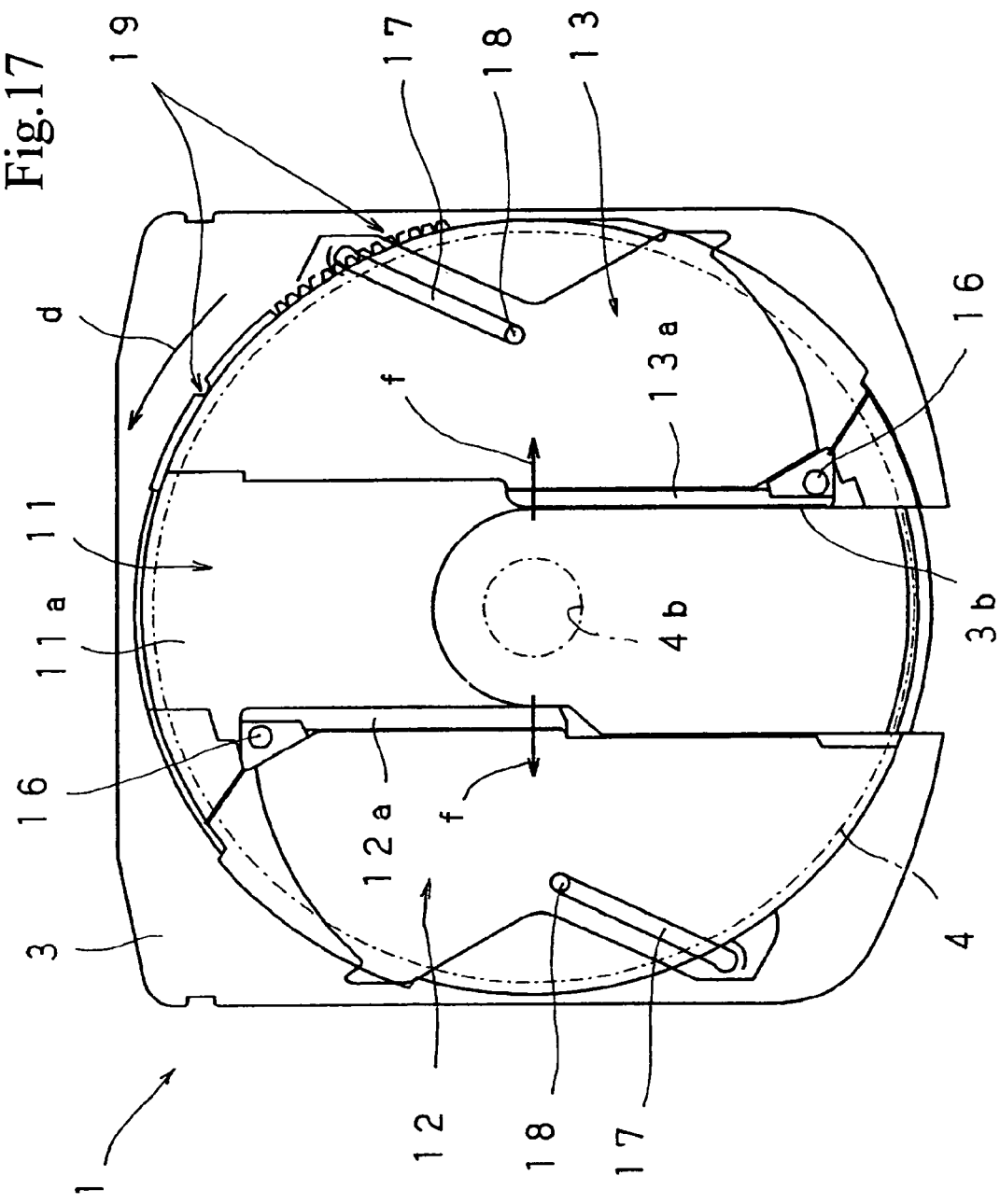
FIG. 17 is a bottom perspective view of the disk cartridge shown in FIG. 11 when the opening of the lower shell is opened by the inner rotor and the pair of shutters.

FIGS. 15 and 17 show a state where the shutters are opened. When the disk cartridge 1 is loaded into the disk drive device (not shown), the inner rotor rotation driver 19 is driven to be rotated by the inner rotor rotation driver member in the direction of the arrow d from outside the window 20 and the inner rotor 11 is thus rotated from the closing position shown in FIGS. 14 and 16 to the opening position shown in FIGS. 15 and 17 in the direction of the arrow d.

The opening 11c of the inner rotor 11 is arranged directly above the opening 3a of the lower shell 3. At the same time, the pair of shutters 12 and 13 entirely pivot in the direction of the arrow d by cam action of the pair of cam slits 17 and the pair of cam pins 18, thus opening in the direction of the arrow f around the points 16. The pair of shutters 12 and 13 escape to opposite sides of the opening 11c, thus fully opening the opening 3a of the lower shell 3.

When the disk cartridge 1 is ejected from the disk drive device, the inner rotor 11 is driven to be rotated by the inner rotor rotation drive member from the opening position shown in FIGS. 15 and 17 to the closing position shown in FIGS. 14 and 16 in the direction of the arrow c. As a result, the opening 3a of the lower shell 3 is closed.

The disk cartridge 1, in which the opening 3a of the lower shell 3 can be opened and closed by the pair of shutters 12 and 13 opened and closed by the rotation of the inner rotor 11, tends to have a large outer thickness C of the entire disk cartridge 1 because the inner rotor 11 and the pair of shutters 12 and 13 are accommodated between the upper shell 2 and lower shell 3.

Applying the disk chucking structures described in FIGS. 1 to 10 allows the inner thickness A defined between the upper shell 2 and the lower shell 3 to be reduced, thus minimizing the outer thickness C of the entire disk cartridge 1. Additionally, the advantageous effect of improved reliability in recording and/or playing back data on the disk 4 is achieved.

While the embodiments of the present invention have been described, the present invention is not limited to these embodiments and is susceptible of various changes based on the technical idea of the present invention.

For example, the present invention is applicable to a disk cartridge called a removable disk caddy in which the upper shell 2 is openable and closable in part or in entirety to the lower shell 3 and the disk 4 is accommodated in the inner rotor 11 so as to be replaceable (removable).

The disk cartridge described above achieves the following advantageous effects.

A disk cartridge according to an aspect of the present invention has a chucking plate arranged on the middle of a disk recording medium so as to be vertically movable together with the disk recording medium and positioning means for limiting movement of the chucking plate in the direction of its diameter while permitting the vertical movement of the chucking plate, the positioning means being arranged not in contact with the disk recording medium and being formed in the lower surface of an upper shell. Therefore, unlike a conventional arrangement, the chucking plate does not require to be held by a plate supporter fixed on the lower surface of the lower shell by ultrasonic welding or the like. As a result, the size of the dimension of gaps in sections having the possibility of contact during rotation of the chucked disk can be maximized within the predetermined dimension of the inner thickness of the disk cartridge without having to increase the entire thickness of the disk cartridge. In other words, the possibility that the disk recording medium and the chucking plate come into contact with the upper and lower shells is minimized while minimizing the dimension of the thickness of the entire disk cartridge. This results in high reliability.

According to an aspect of the present invention, the positioning means may be composed of a peripheral guide or a central guide. This simplifies the structure and the manufacture.

According to an aspect of the present invention, the disk cartridge may further have an upright portion projecting upward or a pendent portion projecting downward from the peripheral flange so that a part of the periphery of the chucking plate is not accidentally fitted into a space between the peripheral guide and the disk recording medium due to vibration, shock, or tilt occurring in transit of the disk cartridge. This offers a superior level of safety.

According to an aspect of the present invention, the disk cartridge may further have an inner rotor arranged between the upper and lower shells and below the disk recording medium and shutters capable of opening and closing an opening formed in the lower shell by being opened and closed by rotation of the inner rotor and arranged between the inner rotor and the lower shell. In this disk cartridge, the chucking plate is arranged on the middle of the disk recording medium so as to be vertically movable together with the disk recording medium and the positioning means for limiting movement of the chucking plate in the direction of its diameter while permitting the vertical movement of the chucking plate is arranged not in contact with the disk recording medium and is formed in the lower surface of the upper shell. Therefore, unlike a conventional arrangement, a plate supporter for holding the chucking plate on the upper shell is not required. The thickness of the entire disk cartridge that tends to have a large thickness is minimized. In addition, the disk recording medium and the chucking plate do not come into contact with the upper shell and lower shell during the rotation of the chucked disk.

The invention claimed is:

1. A disk cartridge accommodating a disk recording medium for recording and/or playing back data between an upper shell and a lower shell so that the disk recording medium is rotatable and vertically movable, the disk cartridge comprising:
   a chucking plate provided on the middle of the disk recording medium so as to be vertically movable in accordance with the vertical movement of the disk recording medium and for chucking the center of the disk recording medium on a turntable; and
   positioning means formed in the lower surface of the upper shell and arranged not in contact with the chucking plate during rotation of the disk recording medium, the positioning means limiting movement of the chucking plate in the direction of its diameter while permitting the vertical movement of the chucking plate.

2. The disk cartridge according to claim 1, wherein the positioning means comprises a peripheral guide capable of coming into contact with the periphery of the chucking plate.

3. The disk cartridge according to claim 1, wherein the positioning means comprises a central guide guiding a cylindrical portion formed in the center of the chucking plate.

4. The disk cartridge according to claim 2, wherein the chucking plate includes a flange formed at the periphery thereof and has an upright portion projecting upward from the flange or a pendent portion projecting downward from the flange, and the positioning means further has a cylindrical rib of which an inner surface is capable of coming into contact with the upright portion or the pendent portion.

5. The disk cartridge according to claim 1 further comprising:
   an inner rotor arranged between the upper shell and the lower shell and below the disk recording medium so as to be rotatable; and
   shutters arranged between the inner rotor and the lower shell and capable of opening and closing an opening formed in the lower shell by being opened and closed by rotation of the inner rotor.

* * * * *